United States Patent [19]

Bindon

[11] Patent Number: 5,033,169
[45] Date of Patent: Jul. 23, 1991

[54] ROPE FASTENER

[75] Inventor: Jeffrey P. Bindon, Durban, South Africa

[73] Assignee: Straight Line Water Sports, Inc., Redmond, Wash.

[21] Appl. No.: 525,780

[22] Filed: May 22, 1990

[30] Foreign Application Priority Data

May 22, 1989 [ZA] South Africa .................. 893.832

[51] Int. Cl.⁵ .......................................... F16G 11/00
[52] U.S. Cl. ............................. 24/129 R; 24/129 B; 24/115 H
[58] Field of Search ............ 24/129 R, 129 A, 129 B, 24/115 H, 115 K; 403/213

[56] References Cited

U.S. PATENT DOCUMENTS

| 676,277 | 6/1901 | Robertson . | |
|---|---|---|---|
| 783,348 | 2/1905 | Wright | 24/129 R |
| 1,463,456 | 7/1923 | Bear . | |
| 1,480,006 | 1/1924 | Ortman | 24/129 R |
| 1,489,602 | 4/1924 | Kohl | 24/129 R |
| 2,149,518 | 3/1939 | Frank, Sr. | 24/115 H |
| 2,151,609 | 3/1939 | Menderman | 24/129 R |
| 2,356,908 | 8/1944 | Arrowsmith | 24/129 R |
| 3,002,780 | 10/1961 | Eggeman . | |
| 3,175,491 | 3/1965 | Robertson | 24/129 R |
| 3,228,078 | 1/1966 | Blomberg . | |
| 3,238,585 | 3/1966 | Froy | 24/129 B |
| 4,150,906 | 4/1979 | Bernard . | |
| 4,785,509 | 11/1988 | Fisher | 24/129 R |
| 4,912,816 | 4/1990 | Brandt | 24/129 R |

FOREIGN PATENT DOCUMENTS 450837 1/1968 Switzerland .

Primary Examiner—Victor N. Sakran
Attorney, Agent, or Firm—Foley & Lardner

[57] ABSTRACT

A rope fastener includes a body having a pair of parallel apertures slidably receiving two adjacent rope segments defining a loop. The fastener further includes an abutment lug disposed in line with the longitudinal axis of the body. The abutment lug has a first portion extending generally vertically from a second end of the top surface of the body and a generally planar second portion which is connected to the first portion and which extends toward a first end of the body. The first portion may include lateral grooves which receive the loop. The abutment lug is engaged by the loop by folding over the rope to form an attachment loop.

8 Claims, 3 Drawing Sheets

ROPE FASTENER

BACKGROUND OF THE INVENTION

This invention relates generally to a rope fastener, and, more particularly, relates to a rope fastener which is adapted to attach a loop of a rope to another object such as a metal ring, another rope, or the like.

Rope fasteners are known which function to fasten a rope to an object by connecting a loop of the rope to the body. An example of one such fastener can be found in U.S. Pat. No. 3,002,780, issued to R. G. Eggeman on Oct. 3, 1961. This fastener includes a body which has a pair of holes through the top and bottom sides of the body portion. At least one hook extends from the top side of the body and has a gradually narrowing shank portion and a bill portion that turns in towards the body. In use, terminal ends of a length of cable are threaded through the holes to form a loop which extends out of the bottom of the body. This loop is passed through the hook to form a sling which tightens about a load to effect a tight grasp.

This fastener, while being effective for some applications, has several disadvantages. The inwardly curved nature of the hook makes it difficult to release the loop. In addition, the relatively wide nature of the space formed by the hook allows the cable to move freely within the hook and increases the possibility of the loop inadvertently slipping out of the hook. Moreover, the relatively large size and heavy construction of this hook makes it poorly suited for applications where light weight and agility are important, for example, recreational activities such as water skiing.

SUMMARY OF THE INVENTION

It is therefore an object of the present invention to provide a fastener that is dependable and that can be used in a wide variety of applications.

In accordance with a first aspect of the invention, the fastener includes a body having a top surface and first and second longitudinal ends. At least one aperture extends longitudinally through the body. An abutment lug is provided having a first portion which extends generally vertically from the top surface of the body near the second end thereof. A generally planar second portion extends perpendicular to the first portion towards the first end of the body, in parallel with a longitudinal axis of the body and spaced from the body.

In accordance with another aspect of the invention, the body includes a second aperture extending longitudinally through the body. The first and second apertures are parallel to one another and are arranged symmetrically about a center of the body.

It is a further object of the invention to provide a device of the type described above for securely fastening a rope to an object.

In accordance with yet another aspect of the invention, a spacing between the second portion of the lug and the top surface of the body is approximately equal to the thickness of the rope and allows the abutment lug to securely hold the rope. In addition, the lateral sides of the first lug portion in one embodiment of the invention curve inwardly to form grooves into which the rope loop seats.

Other objects, features and advantages of the present invention will become apparent to those skilled in the art from the following detailed description. It should be understood, however, that the detailed description and specific examples, while indicating preferred embodiments of the present invention, are given by way of illustration and are not intended to be limiting. Many changes and modifications within the scope of the present invention may be made without departing from the spirit thereof, and the invention includes all such modifications.

DETAILED DESCRIPTION OF THE PREFERRED EMBODIMENTS

A rope fastener constructed in accordance with the present invention includes a body having two spaced apertures located therein which extend in parallel with a longitudinal axis of the body and which slidably receive two adjacent rope segments defining a loop. The fastener further includes an engagement lug that can be releasably engaged by the loop for attaching the rope to another object. The engagement lug comprises a hook-like formation comprised of a first portion extending generally vertically from a point adjacent a second end of the top surface of the body, and a generally planar second portion which is connected to the first portion and which extends parallel to the top surface of the body toward the opposite, first end of the body. The first portion may include lateral grooves which more tightly receive the loop. The abutment lug is engaged by the loop by folding over the rope to form the attachment loop.

Figure 1:
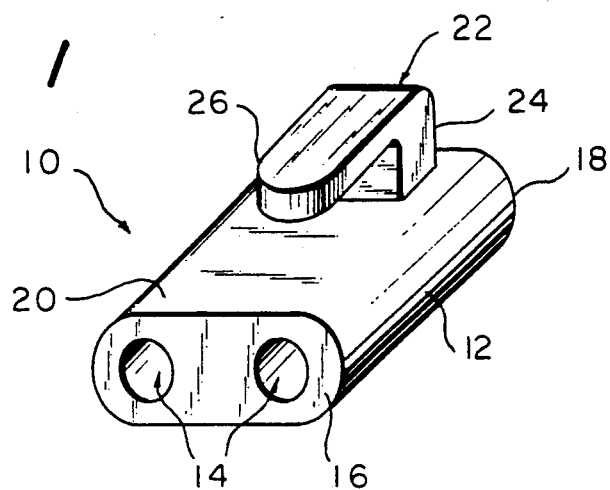
FIG. 1 is a perspective view of a rope fastener in accordance with a first embodiment of the invention.
Figure 2:
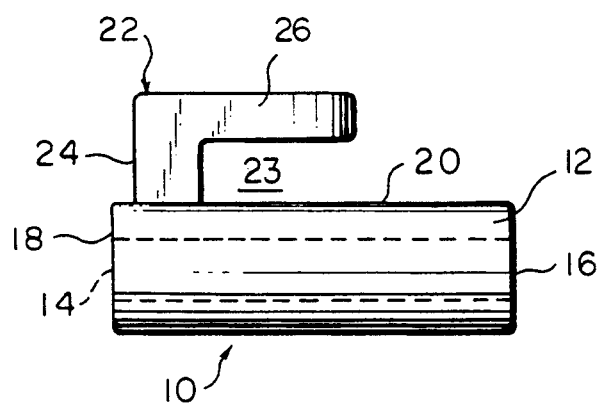
FIG. 2 illustrates a side view of the fastener of FIG. 1.

With reference to FIGS. 1 and 2, a fastener 10 constructed in accordance with the first embodiment of the invention includes a body 12 and an abutment lug 22 integrally molded from a suitable synthetic plastics material such as ABS, nylon, or the like. The body 12 has a pair of cylindrical apertures 14 which pass through the body from a first longitudinal end 16 of the body to a second longitudinal end 18. The apertures 14 are parallel to one another and are arranged symmetrically about the center of body 12. The dimensions of the fastener and the particular material utilized may be determined by the strength requirements of the body and the thickness of the rope.

The abutment lug 22 includes first and second portions 24 and 26 which are integrally formed as shown and which cooperate to form a hook-like formation on which a rope can engage. The first portion 24 projects vertically from the top surface 20 of the body proximate to the second end 18 thereof. The second portion 26 extends perpendicularly to the first portion 24 towards the first end 16 of body 12, the free end of portion 26 terminating approximately midway of the length of the body. The bottom surface of portion 26 defines with a the top surface 20 of body 12 a space 23 into which the rope extends during operation (see FIGS. 4B and 4C).

The free end of portion 26 is rounded to facilitate insertion of the rope into the space 23.

Figure 3:
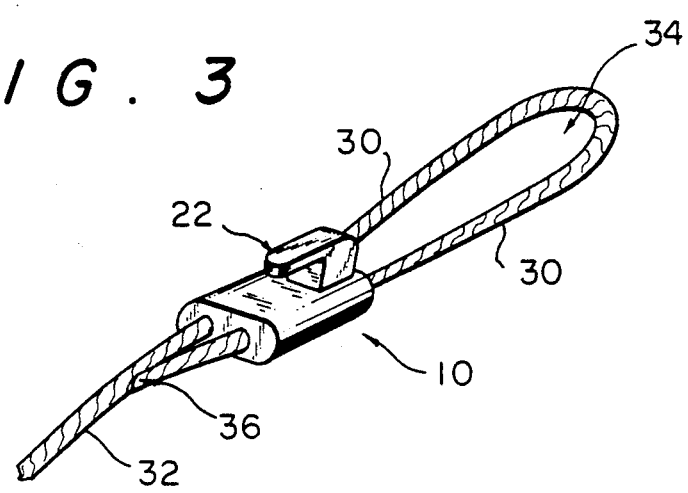
FIG. 3 is a perspective view of one possible configuration of a rope and the rope fastener of the first embodiment of the invention.

With reference to FIG. 3, a segment 30 of a rope 32 is slidably received in each of the apertures 14 to define a closed loop 34. The loop 34 can be formed in any suitable manner, for example, by connecting the free end of the rope to the remainder of the rope 32, as shown. Other methods include inter-braiding, knotting, clamping or the like. It can thus be seen that the rope fastener 10 can either form a part of rope 32, where the loop 34 is permanently formed, or can be separately provided for use with different ropes.

Figure 4A:
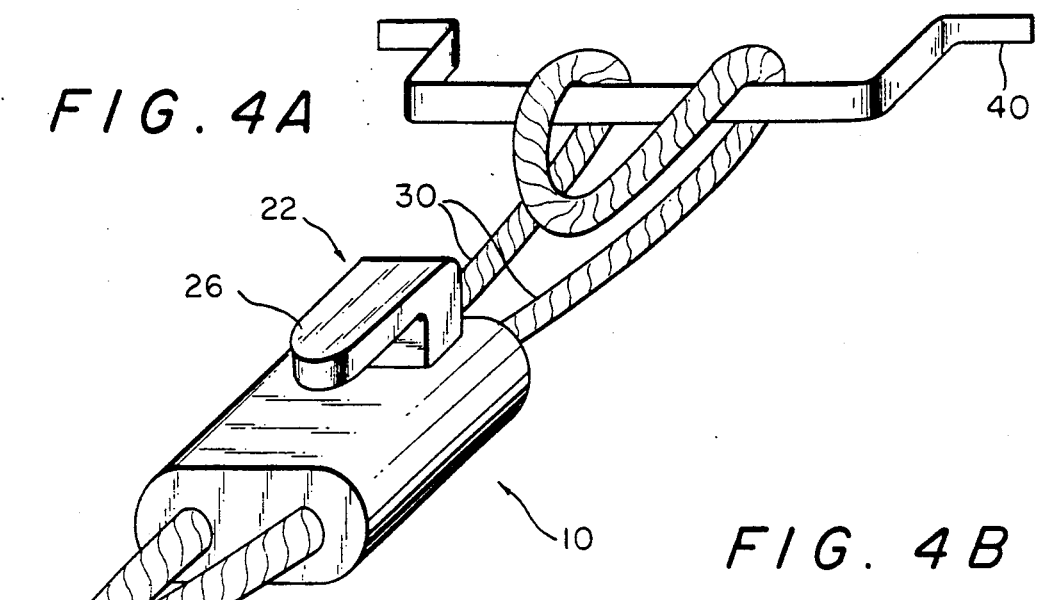
FIG. 4A, 4B, and 4C illustrate a mode of use of the rope fastener of FIG. 1.
Figure 4B:
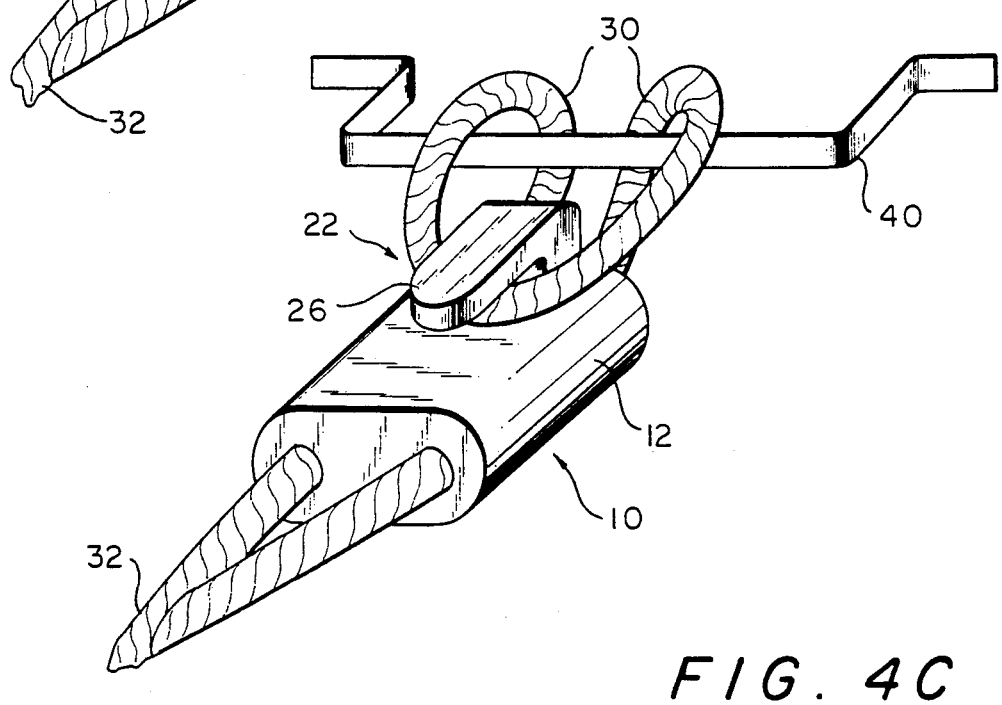
Figure 4C:
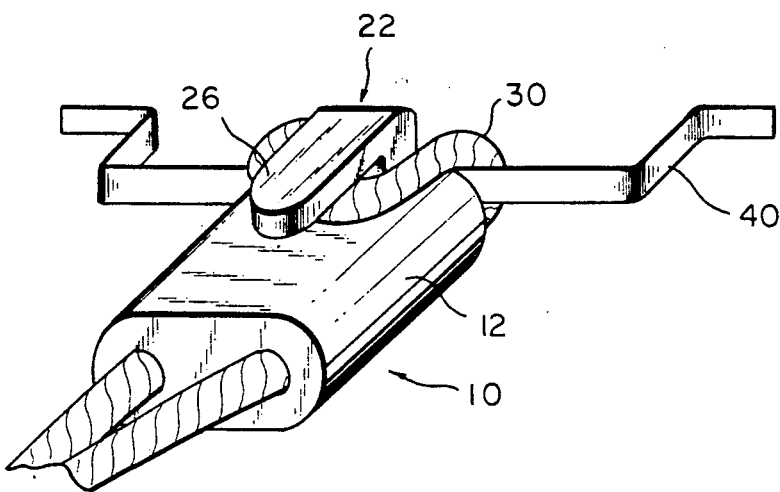

The manner in which the rope fastener 10 can be used to attach a rope to another object will now be described. Referring to FIGS. 4A–4C of the drawings, the fastener 10 is used to fasten rope 32 to a handle 40 which in turn can be secured to another body. In order to fasten the rope onto handle 40, the segments 30 forming the closed loop 34 are passed under and over the outwardly extending portion of the handle 40, whereafter the loop can be inserted below the top portion 26 of the abutment lug 22 in the manner illustrated in FIG. 4B. The rounded free end of portion 26 of the abutment lug serves to facilitate the fastening process by guiding the loop into the space 23 defined between the portion 26 and the top surface 20 of body 12. The height of space 23 is preferably designed to be approximately equal to the thickness of the rope segments 30 to provide a secure fit of the rope in the abutment lug. This secure fit prevents the loop from being withdrawn from the lug when the loop is being tightened, and also decreases the likelihood of the rope slipping out of space 23 in the event the loop is temporarily slackened. The loop can then be tightened by pulling the rope 32 which will cause fastener 10 to be slidably displaced along the rope segments 30, thus tightening the loop in the manner illustrated in FIG. 4C.

The rope 32 can be released in the reverse manner by merely pushing the segments 30 back through the body 12 of fastener 10, which will then allow the loop 34 to be released from the abutment lug 22, thereby releasing the rope 32.

Figure 5:
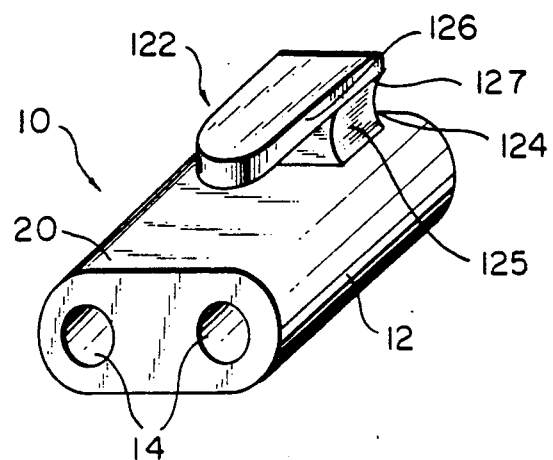
FIG. 5 is a perspective view of a fastener according to a second embodiment of the invention.
Figure 6:
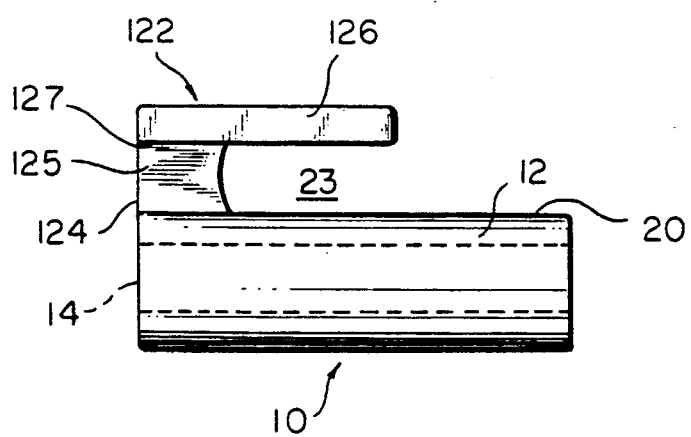
FIG. 6 is a side view of the fastener of FIG. 5.

FIGS. 5 and 6 illustrate a second embodiment of the invention in which the opposed sides of portion 124 of abutment lug 122 are curved inwardly to define grooves 125. The grooves 125 allow a better engagement of the loop in the rope with the abutment lug when the loop is tightened in the manner illustrated in FIG. 4C., thereby providing for a more secure frictional retention. The tops of the grooves are defined by ridges 127 which inhibit the upward movement of the loop out of the grooves 125.

The front surface of the portion 124 of the lug is also concavely curved (see FIG. 6), with the intersection of the opposite ends of the front surface with the grooves being rounded off to form a substantially continuous groove extending around the front and sides of the portion 124.

It will thus be seen that the rope fastener of the present invention greatly facilitates the retention of ropes to different elements or objects. The rope fastener, being light-weight and reliable, is particularly well suited for use in boating applications such as mooring, the attaching of sails, attaching a rope to the handle of water skis, and the like. The rope fastener can also be used in conjunction with towing ropes, guy ropes, and in any other similar applications.

While specific embodiments of the invention have been described and illustrated, it will be clear that variations in the details of the embodiments specifically illustrated and described may be made without departing from the true spirit and scope of the invention as defined in the appended claims.

What is claimed is:

1. A device for fastening a rope having a loop defined by first and second sections extending from said device, said device comprising:
   a. a body having a central longitudinal axis, a top surface, first and second ends, and a pair of spaced apertures extending longitudinally through said body and slidably receiving the respective first and second sections of said rope; and
   b. An abutment lug comprising a first portion extending generally vertically from said top surface of said body adjacent said second end thereof, and a generally planar second portion connected to said first portion and extending towards said first end of said body parallel to said longitudinal axis, said planar second portion having top and bottom surfaces with said bottom surface being flat and uniformly spaced from the top surface of said body, said space being approximately equal to the thickness of said rope whereby said loop can first be extended over an object to which the rope is to be secured, and then over said lug into said space, whereby the pulling of said rope sections in a direction away from said loop serves to move said loop through said space into contact with said first portion of said lug, other portions of said loop being tightly wrapped around said object to which the rope is to be secured, said loop being loosened by moving said rope sections toward said loop so that sufficient slack is formed in said loop to permit said loop to be moved outwardly away from said abutment lug.

2. The device of claim 1, wherein said apertures are parallel with one another and are arranged symmetrically about said central longitudinal axis of said body.

3. The device of claim 2, wherein said apertures are cylindrical.

4. The device of claim 1, wherein said second portion of said lug has an outer free end which is rounded so as to guide said loop into said space.

5. The device of claim 1, wherein lateral sides of said first portion of said abutment lug are concavely shaped to form grooves into which said loop seats for more firm engagement.

6. The device of claim 1, wherein said body and said abutment lug are integrally molded from a plastics material.

7. The device of claim 1, wherein said first portion of said lug has a front surface which is concavely shaped to form a groove for better seating of said loop.

8. The device of claim 7, wherein lateral sides of said first portion of said lug are concavely shaped to form grooves, which cooperate with said groove formed in the front surface of said first portion of said lug so as to form a substantially continuous groove which functions to provide better frictional retention of said rope.

* * * * *